(12) United States Patent
Miller

(10) Patent No.: US 8,146,944 B2
(45) Date of Patent: Apr. 3, 2012

(54) ADJUSTABLE TOUR PACK ASSEMBLY

(75) Inventor: Gary Miller, Waco, KY (US)

(73) Assignee: SaNico, LLC, Ferguson, KY (US)

( * ) Notice: Subject to any disclaimer, the term of this patent is extended or adjusted under 35 U.S.C. 154(b) by 527 days.

(21) Appl. No.: 12/380,035

(22) Filed: Feb. 23, 2009

(65) Prior Publication Data

US 2010/0213695 A1    Aug. 26, 2010

(51) Int. Cl.
  *B60R 9/06* (2006.01)
  *B62J 7/00* (2006.01)
(52) U.S. Cl. .................. 280/769; 224/413
(58) Field of Classification Search .............. None
  See application file for complete search history.

(56) References Cited

U.S. PATENT DOCUMENTS

| | | | | |
|---|---|---|---|---|
| 3,394,912 A * | 7/1968 | Bullen | | 248/430 |
| 3,850,353 A * | 11/1974 | Foulds | | 224/418 |
| 3,963,158 A * | 6/1976 | Clenet | | 224/418 |
| 4,141,587 A * | 2/1979 | Holcomb | | 297/215.1 |
| 4,247,030 A * | 1/1981 | Amacker | | 224/401 |
| 4,266,703 A * | 5/1981 | Litz | | 224/443 |
| 4,269,335 A * | 5/1981 | LaRose et al. | | 224/443 |
| 4,300,706 A * | 11/1981 | Hendrick et al. | | 224/412 |
| 4,447,088 A * | 5/1984 | Bodlovic | | 297/188.21 |
| 4,466,660 A * | 8/1984 | Mabie | | 297/215.11 |
| 4,501,384 A * | 2/1985 | Itoh | | 224/435 |
| 4,562,944 A * | 1/1986 | Jackson et al. | | 224/454 |
| 5,127,560 A * | 7/1992 | Miyamoto et al. | | 224/413 |
| 5,127,561 A * | 7/1992 | Miyamoto | | 224/413 |
| 5,147,077 A * | 9/1992 | Nakajima et al. | | 224/413 |
| 5,441,330 A * | 8/1995 | Rojas | | 297/383 |
| 5,518,291 A * | 5/1996 | Shaide | | 297/215.12 |
| 5,558,260 A * | 9/1996 | Reichert | | 224/413 |
| 5,588,698 A * | 12/1996 | Hsueh | | 297/184.11 |
| 5,725,138 A * | 3/1998 | Zagrodnik | | 224/413 |
| 5,732,965 A * | 3/1998 | Willey | | 280/288.4 |
| 5,931,360 A * | 8/1999 | Reichert | | 224/413 |
| 6,007,150 A * | 12/1999 | Clerkin et al. | | 297/215.12 |
| 6,347,804 B1 * | 2/2002 | Seibel | | 280/288.4 |
| 6,443,344 B1 * | 9/2002 | Nicosia et al. | | 224/413 |
| 6,484,914 B1 * | 11/2002 | Willey | | 224/413 |
| 6,568,699 B2 * | 5/2003 | McCann | | 280/304.4 |
| 6,659,547 B2 * | 12/2003 | Petersen | | 297/215.1 |
| 6,729,515 B2 * | 5/2004 | Nicosia et al. | | 224/413 |
| 6,817,501 B1 * | 11/2004 | Rogers et al. | | 224/413 |
| 6,966,471 B1 * | 11/2005 | Wilson et al. | | 224/413 |
| 7,111,903 B1 * | 9/2006 | Snelson | | 297/256.16 |
| 7,147,281 B2 * | 12/2006 | Michisaka et al. | | 297/215.12 |
| 7,165,702 B1 * | 1/2007 | Billberg | | 224/401 |
| 7,275,787 B1 * | 10/2007 | Grove | | 297/215.12 |
| 7,284,796 B2 * | 10/2007 | Snelson | | 297/230.1 |
| 7,654,496 B2 * | 2/2010 | Sharpe et al. | | 248/222.11 |
| 7,661,761 B1 * | 2/2010 | Ortega | | 297/352 |
| 7,793,747 B2 * | 9/2010 | Brown | | 180/219 |
| 7,854,460 B2 * | 12/2010 | Tweet et al. | | 296/65.03 |
| 7,967,336 B2 * | 6/2011 | Biseli | | 280/769 |
| 7,997,602 B2 * | 8/2011 | Chan et al. | | 280/202 |
| 8,002,125 B2 * | 8/2011 | Van Wyk | | 211/85.7 |
| 2002/0011745 A1 * | 1/2002 | Petersen | | 297/215.11 |
| 2002/0029917 A1 * | 3/2002 | Galbraith et al. | | 180/219 |

(Continued)

*Primary Examiner* — J. Allen Shriver, II
*Assistant Examiner* — Jacob Meyer
(74) *Attorney, Agent, or Firm* — Stockwell & Smedley, PSC

(57) ABSTRACT

An adjustable assembly attaches to the rear storage compartment of a motorcycle and can be positioned in different locations so as to make the rear seating area larger or smaller as desired.

26 Claims, 4 Drawing Sheets

U.S. PATENT DOCUMENTS

| | | | |
|---|---|---|---|
| 2002/0175543 A1* | 11/2002 | Nicosia et al. | 297/215.12 |
| 2004/0020953 A1* | 2/2004 | Kopidlansky | 224/413 |
| 2004/0164113 A1* | 8/2004 | Thomas et al. | 224/413 |
| 2005/0134098 A1* | 6/2005 | MacKeben | 297/195.1 |
| 2005/0150921 A1* | 7/2005 | Schneider | 224/413 |
| 2006/0163302 A1* | 7/2006 | Knoch et al. | 224/413 |
| 2006/0243770 A1* | 11/2006 | Kortbein et al. | 224/547 |
| 2006/0244291 A1* | 11/2006 | Buell et al. | 297/215.12 |
| 2006/0273641 A1* | 12/2006 | Snelson | 297/256.16 |
| 2006/0278456 A1* | 12/2006 | Desrosiers | 180/219 |
| 2007/0262108 A1* | 11/2007 | Columbia | 224/519 |
| 2008/0174099 A1* | 7/2008 | Brown | 280/854 |
| 2008/0296329 A1* | 12/2008 | Guckes | 224/412 |
| 2009/0001113 A1* | 1/2009 | Butkiewicz et al. | 224/413 |
| 2010/0012416 A1* | 1/2010 | Chan et al. | 180/219 |
| 2010/0025443 A1* | 2/2010 | Racz et al. | 224/545 |
| 2010/0059464 A1* | 3/2010 | Van Wyk | 211/86.01 |
| 2010/0059465 A1* | 3/2010 | Van Wyk | 211/94.02 |
| 2010/0066069 A1* | 3/2010 | Bradshaw | 280/769 |
| 2010/0213695 A1* | 8/2010 | Miller | 280/769 |
| 2010/0243691 A1* | 9/2010 | Salisbury | 224/413 |
| 2010/0282801 A1* | 11/2010 | Willard et al. | 224/413 |
| 2010/0320738 A1* | 12/2010 | Biseli | 280/769 |
| 2011/0049205 A1* | 3/2011 | Laperle et al. | 224/425 |
| 2011/0139843 A1* | 6/2011 | Thomas et al. | 224/413 |

* cited by examiner

ADJUSTABLE TOUR PACK ASSEMBLY

BACKGROUND OF THE INVENTION

1. Field of the Invention

The present invention relates to motorcycles and, more particularly, to motorcycle seating adjustments.

2. Description of Related Art

The number of motorcycle riders has increased dramatically in recent history and now many families have joined the ranks instead of merely solo riders. Additionally, with larger storage compartments, the ability to comfortably travel farther has improved as well. Comfort is one aspect of motorcycle riding that can be improved, especially from the perspective of a rear passenger. The driver has some freedom in selecting a comfortable seating position but the passenger is often left with little ability to adjust their seating area, especially its size.

On many motorcycles there is a rear storage compartment that is often times connected to a seat back or cushion. This arrangement is commonly referred to as a "tour pack". Because the storage compartment is rigidly fixed to the frame or body of the motorcycle, the rear seat on the motorcycle has a predetermined size that cannot be adjusted. Thus, the rear seat may be too small for a larger rider or may be too large for a smaller rider to feel safe and secure. It is therefore beneficial to have an adjustable rear seat.

Past techniques for making a sliding rear storage compartment have a number of disadvantages. In particular, one attempt involving a motorized, or electrically controlled, sliding rear storage compartment included a bulky assembly that raised the rear storage compartment high above the motorcycle body causing an unaesthetic appearance as well as interfering with the aerodynamics and ridability of the motorcycle.

Thus there remains an unmet need for a sliding rear storage assembly on a motorcycle that is unobtrusive, easy to use, and allows adjustment of the rear seating area of the motorcycle.

BRIEF SUMMARY OF THE INVENTION

Embodiments of the present invention relate to an adjustable assembly that attaches to the rear storage compartment of a motorcycle and can be positioned in different locations so as to make the rear seating area larger or smaller as desired.

It is understood that other embodiments of the present invention will become readily apparent to those skilled in the art from the following detailed description, wherein it is shown and described only various embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF DRAWINGS

Various aspects of the invention are illustrated by way of example, and not by way of limitation, in the accompanying drawings, wherein.

DETAILED DESCRIPTION OF INVENTION

The detailed description set forth below in connection with the appended drawings is intended as a description of various embodiments of the invention and is not intended to represent the only embodiments in which the invention may be practiced. The detailed description includes specific details for the purpose of providing a thorough understanding of the invention. However, it will be apparent to those skilled in the art that the invention may be practiced without these specific details. In some instances, well known structures and components are shown in block diagram form in order to avoid obscuring the concepts of the invention.

In the description provided herein, the phrase "tour pack" is used to refer to a rear storage compartment of a motorcycle. Such storage compartments may also be referred to using other names such luggage rack or trunk; however, "tour pack" as used herein is intended to encompass all such rear storage compartment on a motorcycle that help define the rear seating space. Also, in some instances, specific materials for pieces of the invention are suggested such as stainless steel, aluminum, metal, nylon, etc. One of ordinary skill will recognize that the present invention is not limited to these specific materials but that appropriate alternative materials may easily be substituted that will withstand the intended use and environment expected for the present invention. Also, different materials may be substituted to alter or enhance the aesthetic appearance of some aspects of the present invention as well.

Figure 1:
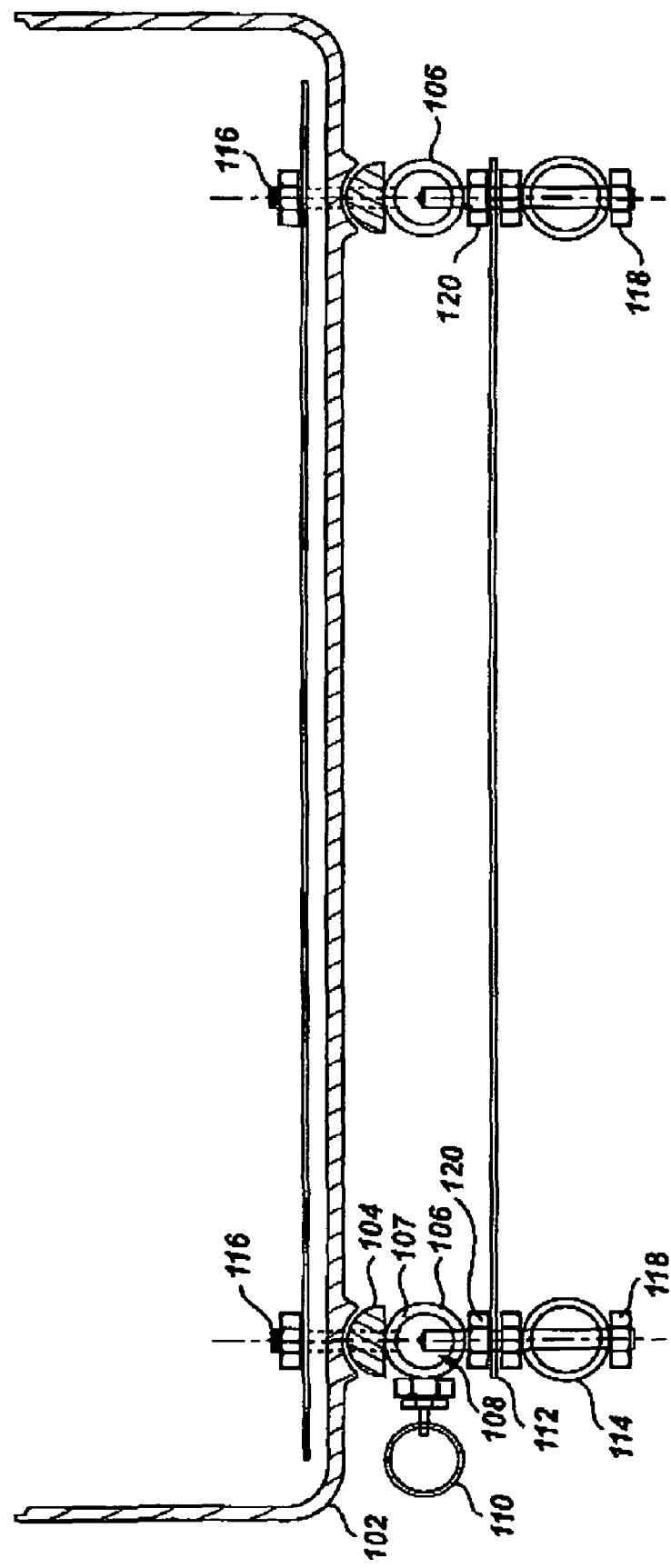
FIG. 1 illustrates a front view of a sliding tour pack assembly in accordance with the principles of the present invention.

FIG. 1 illustrates a front view of a sliding tour pack assembly in accordance with the principles of the present invention. In general, embodiments of the present invention include a mounting portion that is attached to the frame or body of a motorcycle and another mounting portion that is attached to a rear storage compartment for the motorcycle. These two mounting portions are then attached to one another in such a way that they may slide forwards and backwards relative to one another. In this way, the rear storage compartment may slide forwards and backwards relative to the motorcycle body in order to increase or decrease the rear seating area.

For example, for a larger rider, the rear storage compartment can be slid far to the rear so as to increase the rear seating area. This may also be done for a smaller rider to allow them a more comfortable sitting position or to partially recline. For a smaller rider, the rear storage compartment may be slid forward to decrease the space between the rear seat back and the front seat. Such a position may make the smaller rider feel safer or more secure in the rear seat.

In general, a tour pack is fixed to a motorcycle frame tube in a predetermined configuration. For example, four bolts may be positioned on the frame tube that align with four mounting holes of the tour pack. These four bolts may, for example be arranged so that there are two on each side of the tour pack to securely hold the tour pack in place. Of course, various numbers of bolts, a variety of bolt placements, and a variety of bolt sizes may all be used to attach a tour pack to the motorcycle frame.

In the front view of FIG. 1, a front view of a sliding assembly in accordance with the principles of the present invention is depicted attached to a motorcycle frame and tour pack. The tour pack and the motorcycle frame tube are shown for clarity and understanding of the invention; however, some embodiments of the present invention do not necessarily include the frame tube and the tour pack.

A support plate 112 is shown that is attached to the motorcycle frame tube 114. This support plate 112 may be constructed from a variety of materials without departing from the scope of the present invention such as 22 gauge stainless steel. The support plate 112 is rigid enough to maintain the sliding tubes 106 in alignment with one another. By keeping them substantially parallel to one another, the assembly (as described in detail later) may slide more easily and reduce binding of the different pieces. As shown, the support plate 112 may be attached to the motorcycle frame 114 using bolts 118. Because the unaltered tour pack 102 is usually attached directly to the frame 114 using bolts, similar bolts 118 may be used to attach to the frame 114 in practicing embodiments of the present invention. If other attachment methods are originally utilized to attach the tour pack to the frame 114, then those attachment methods may be adapted as well to attach the support plate 112. Thus, the attachment methods and techniques may be customized to each different motorcycle frame without departing from the scope of the present invention.

Next a sliding apparatus 107 is attached to each side of the support plate 112. As more clearly shown in later figures, the sliding apparatus 107 includes an outer sliding tube 106 and an inner sliding rod 108. The inner sliding rod 108 may be rigidly attached to the support plate 112 such as, for example, by bolts 120 or similar fasteners. The sliding tube 106 is then rigidly attached to the tour pack 102 such as, for example by fasteners 116. The fasteners 116 used to attach the tour pack 102 to the sliding tube 106 may be positioned and arranged to accommodate the original mounting locations for the tour pack. In addition, appropriate washers and nuts may be utilized to ensure a secure and safe fit of all components. However, other fasteners and mounting positions may be used as well without departing from the scope of the present invention.

In the embodiment depicted in FIG. 1 a spacer, such as a nylon spacer, 104 may be located between the sliding tube 106 and the tour pack 102. This nylon spacer is constructed so as to accommodate the fasteners 116 which will hold the spacer 104 in position between the sliding tube 106 and the tour pack 102. The profile of the spacer 104 may be shaped to as to form a complimentary shape for the underside of the tour pack 102. For example, the original tour pack 102 may have indentations to match the shape of the motorcycle frame 114. Therefore, the spacer 104 may also be shaped to fit within this indentation as well.

The sliding tube 106 and sliding rod 108 are shown in FIG. 1 as substantially cylindrical in shape. This shape tends to provide better slidability with less binding and dirt entrapment. However, one of ordinary skill will recognize that other shaped sliding tubes and rods may be used as alternatives.

The sliding tube 108 includes one or more detents to position and lock the sliding tube 106 and the sliding rod 108 in fixed positions relative to one another. For example, a plunger 110 may be positioned to pass through the sliding tube 106 to engage one or more surface features of the sliding rod 108. The plunger 110 may be pulled out of engagement so that the sliding apparatus 107 may be changed and then returned to engagement to lock the sliding apparatus 107 in position. A spring loaded plunger 110 is beneficial for this purpose as the spring may operate so as to return the plunger 110 to its engaged position when released. The sliding tube 106 and slider rod 108 on the right side of FIG. 1 does not necessarily have a corresponding plunger 110. Because of its connection with the support plate 112 and the tour pack 102, the sliding apparatus on the right of FIG. 1 is also held in position by the action of the sliding apparatus 107 being locked in place by the plunger 110.

Figure 2:
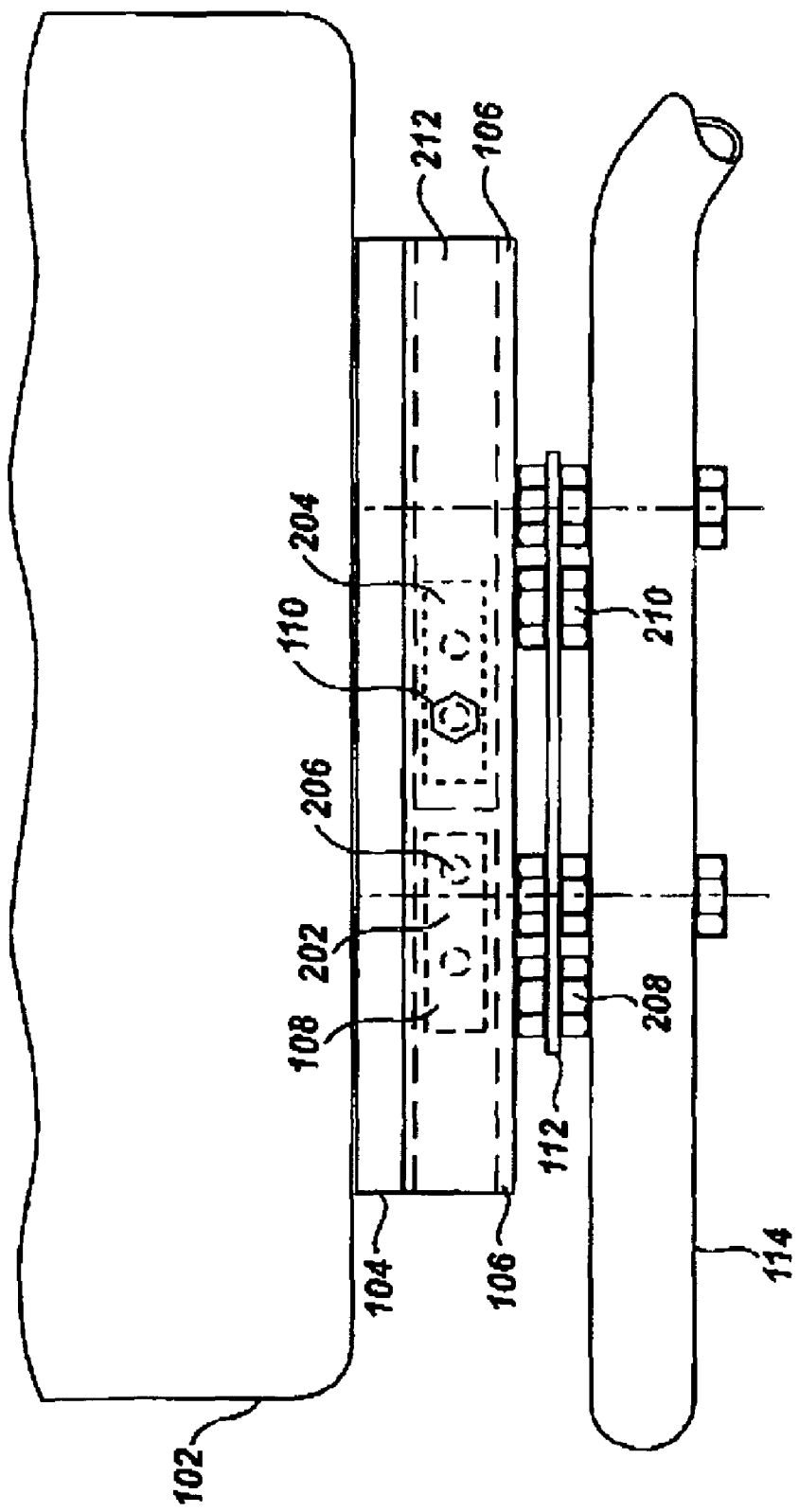
FIG. 2 illustrates one side view of the sliding tour pack assembly of FIG. 1.

FIG. 2 illustrates one side view of the sliding tour pack assembly of FIG. 1. From this view it becomes more clear that the sliding tube 106 extends from front to back of the motorcycle, or in other words, in a direction substantially aligned with the longitudinal axis of either the motorcycle or the tour pack. In contrast, the support plate 112 extends longitudinally and traversely such as, for example, extending five to six inches in a longitudinal direction (front to back) and ten to twelve inches in a traverse direction (side to side). Also, it is more clearly shown that the tour pack 102 is raised off the surface of the motorcycle frame 114 by the small amount needed to accommodate the support plate 112 and some fasteners. In the embodiment of FIG. 2, one beneficial detail about the sliding rod 108 is depicted. The sliding rod may be comprised of two separate pieces 202, 204. As shown, rear piece 202 is attached to the support plate 112 using a fastener 208 and front piece 204 is similarly attached using a fastener 210. The use of two pieces 202, 204 instead of one long sliding rod reduces binding that may occur with a long rod in such an application.

The inside diameter of the sliding tube 106 and the outside diameter of the pieces 202, 204 are sized to allow a close fit but also to allow easy sliding between the pieces. Depending on the materials used, one of ordinary skill will be able to determine an appropriate clearance size that maximizes the ease of sliding while minimizing wear and minimizing dirt collection. The materials used for both the tube 106 and rod pieces 202, 204 may be stainless steel or a similar sturdy material, and silicone or other lubricant may also be used to enhance the ease of sliding.

The pieces 202, 204 also include portions 206 that are shaped to engage the plunger 110 such as a partial hole drilled in the pieces 202, 204. Multiple such portions 206 may be utilized to lock the tube and rod into a desired position. Although a plunger 110 and holes 206 are shown in FIG. 2, other known, functionally equivalent, locking mechanisms may also be used to hold the tube 106 in a fixed position relative to the pieces 202, 204. Also, the ends of the pieces 202, 204 that are adjacent to one another may be shaped to create a portion to engage the plunger 110 as well. So for example if each piece 202, 204 has two holes 206, the plunger may engage in one of five different position—two for each piece 202, 204 and one where the pieces 202, 204 meet.

Figure 3A:
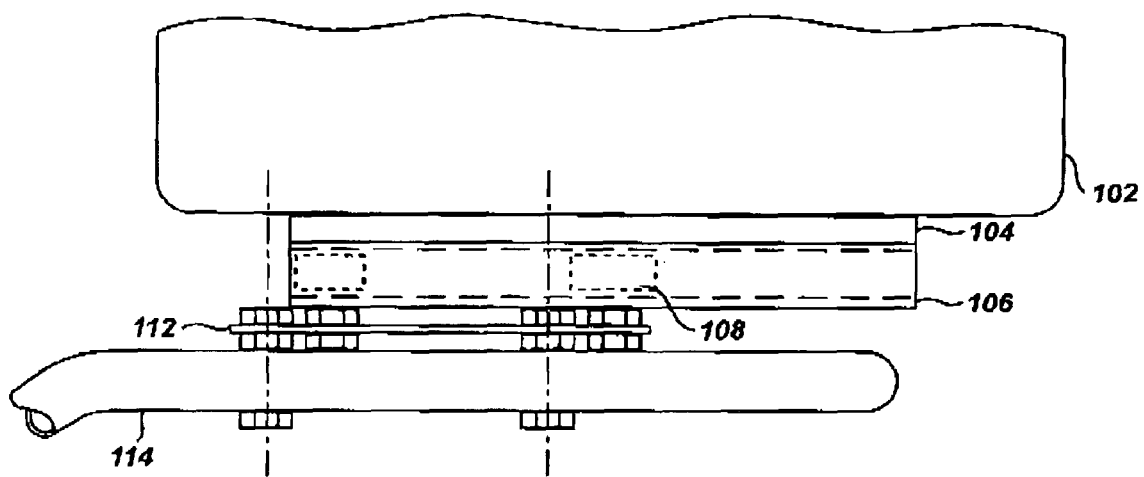
FIG. 3A and FIG. 3B illustrate the other side view of the sliding tour pack assembly of FIG. 1
Figure 3B:
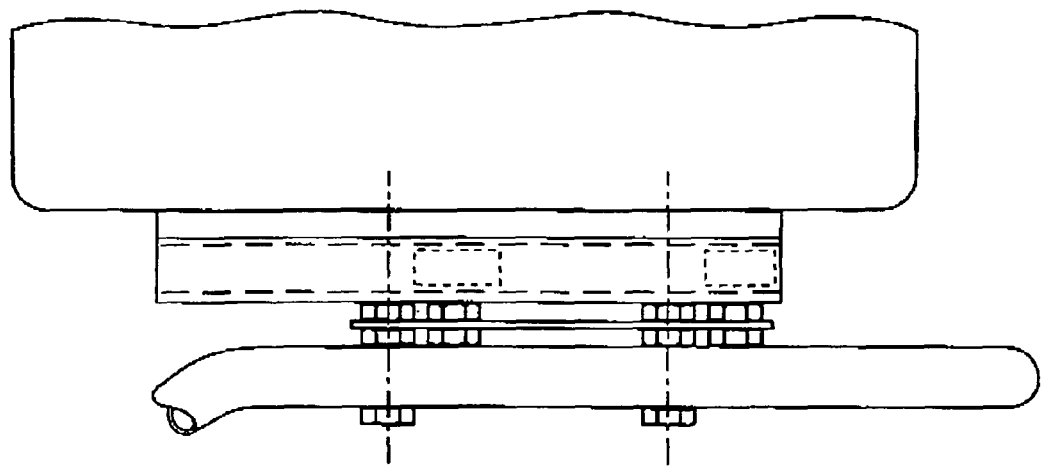

FIG. 3A and FIG. 3B illustrate the other side view of the sliding tour pack assembly of FIG. 1. FIG. 3A shows the sliding assembly positioned so that the tour pack is in the most rearward position while FIG. 3B shows the tour pack in its most forward position. As apparent from the description above, the sizes of the various components and their respective components may be selected to accomplish a wide range of difference between the two positions shown in FIGS. 3A and 3B. In one particular embodiment, the sliding assembly allows the tour pack to slide forward about two inches from its original position and rearward about two inches from its original position. As a result, the range of adjustability will be about four inches between the two positions shown in FIGS. 3A and 3B. This range of motion will accommodate typical sized motorcycles. However, for custom sized motorcycles other ranges of adjustability may be designed without departing from the scope of the present invention.

Figure 4:
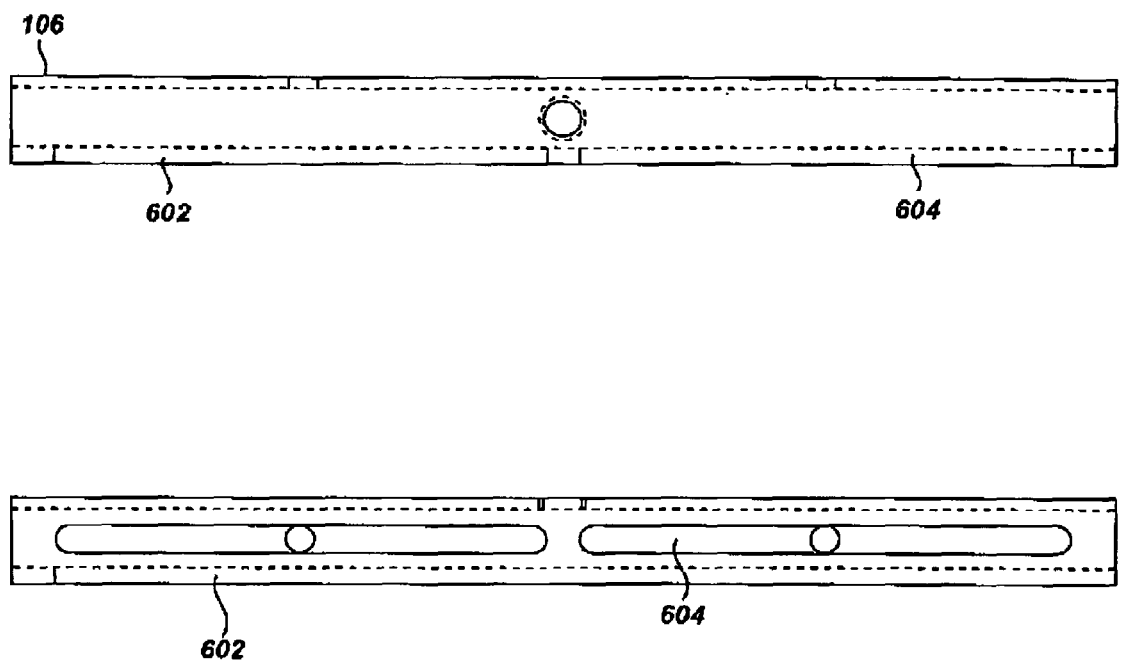
FIG. 4 illustrates one sliding tube in accordance with the principles of the present invention.

FIG. 4 illustrates one sliding tube in accordance with the principles of the present invention. As one example of various sizes that may be used, the tube 106 may have an inner diameter of about ½ inch and an outside diameter of about ¾ inch and be constructed of 9 gauge 304 stainless steel. As shown in FIG. 4, the tube 106 may have two slots 602, 604 to accommodate the fasteners 208, 210 that attach to the pieces 202, 204; with each slot being about four inches in length making the overall length of the tube about nine inches.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but are to be accorded the full scope consistent with each claim's language, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A sliding assembly for a motorcycle tour pack comprising:
    a first sliding apparatus, including a first sliding tube and a first sliding rod within the first sliding tube; the first sliding tube and first sliding rod configured to slide relative to one another in a direction, the direction being substantially parallel with their respective major axes;
    a second sliding apparatus, including a second sliding tube and a second sliding rod within the second sliding tube; the second sliding tube and second sliding rod configured to slide relative to one another in the direction;
    a support plate, wherein the first sliding apparatus is coupled with the support plate adjacent a first edge of the support plate and the second sliding apparatus is coupled with the support plate adjacent a second edge of the support plate, opposite the first edge;
    a locking mechanism configured to releasably hold the first sliding apparatus in one of a plurality of selectable positions; and
    a first set of fasteners configured to couple the first and second sliding tubes with a motorcycle tour pack; and
    a second set of fasteners configured to couple the support plate with a motorcycle frame,
    wherein the locking mechanism includes:
        a plunger coupled with the first sliding tube and having a first end extending inwardly through a side of the first sliding tube;
        a plurality of openings in the first sliding rod configured to accept a portion of the first end, wherein the plurality of openings respectively correspond to the plurality of selectable positions; and
    wherein when the portion of the first end is within one of the plurality of openings, the first sliding rod and first sliding tube are prevented from sliding relative to one another and when the portion of the first end is not within one of the plurality of openings, the first sliding rod and the first sliding tube slide relative to one another.

2. The sliding assembly of claim 1, wherein the first and second sliding rods are coupled with the support plate.

3. The sliding assembly of claim 1, further comprising:
    a first spacer, configured to accommodate a first portion of the first set of fasteners and positioned over the first sliding tube; and
    a second spacer, configured to accommodate a second portion of the first set of fasteners and positioned over the second sliding tube.

4. The sliding assembly of claim 3, wherein the first and second spacers each includes a side opposite the first and second sliding tubes, respectively, shaped to complement a portion of the tour pack.

5. The sliding assembly of claim 1, wherein the direction of the major axes is substantially aligned with a longitudinal axis of the tour pack.

6. The sliding assembly of claim 1, wherein the plurality of selectable positions includes a forward-most position, a middle position, and a rearward-most position.

7. The sliding assembly of claim 6 wherein a distance between the rearward-most position and the middle position is approximately two inches.

8. The sliding assembly of claim 6, wherein a distance between the forward-most position and a rearward-most position is approximately four inches.

9. The sliding assembly of claim 1, wherein the first set of fasteners includes a plurality of bolts, each bolt attached to one of the first and second sliding tubes and configured to extend through original mounting holes of the tour pack.

10. The sliding assembly of claim 1, wherein the second set of fasteners includes a plurality of bolts, each bolt configured to extend through holes in the support plate into original mounting holes of a motorcycle frame tube.

11. The sliding assembly of claim 1, wherein the first sliding rod comprises a first piece and a second piece, each individually coupled with the support plate.

12. The sliding assembly of claim 11, wherein the first piece has a first end adjacent a second end of the second piece and the first and second ends are shaped to form one of the plurality of openings.

13. The sliding motorcycle tour pack of claim 1, further comprising:
    a first spacer, positioned over the first sliding tube between the first sliding tube and the tour pack; and
    a second spacer, positioned over the second sliding tube between the second sliding tube and the tour pack.

14. The sliding motorcycle tour pack of claim 13, wherein the first and second spacers each includes a side opposite the first and second sliding tubes, respectively, shaped to complement a portion of an outside surface of the tour pack.

15. A sliding assembly for a motorcycle tour pack comprising:
    a first sliding apparatus, including a first sliding tube and a first sliding rod within the first sliding tube; the first sliding tube and first sliding rod configured to slide relative to one another in a direction, the direction being substantially parallel with their respective major axes;
    a second sliding apparatus, including a second sliding tube and a second sliding rod within the second sliding tube; the second sliding tube and second sliding rod configured to slide relative to one another in the direction;
    a support plate, wherein the first sliding apparatus is coupled with the support plate adjacent a first edge of the support plate and the second sliding apparatus is coupled with the support plate adjacent a second edge of the support plate, opposite the first edge;
    a locking mechanism configured to releasably hold the first sliding apparatus in one of a plurality of selectable positions; and a first set of fasteners configured to couple the first and second sliding tubes with a motorcycle tour pack; and a second set of fasteners configured to couple the support plate with a motorcycle frame, wherein the first sliding rod comprises a first piece and a second piece, each individually coupled with the support plate, wherein the locking mechanism includes:

a plunger coupled with the first sliding tube and having a first end extending inwardly through a side of the first sliding tube;

a plurality of openings in each of the first piece and second piece configured to accept a portion of the first end, wherein the plurality of opening respectively correspond to the plurality of selectable positions; and wherein when the portion of the first end is within one of the plurality of openings, the first sliding rod and first sliding tube are prevented from sliding relative to one another and when the portion of the first end is not within one of the plurality of openings, the first sliding rod and the first sliding tube slide relative to one another.

16. The sliding assembly of claim 15, wherein the first piece has a first end adjacent a second end of the second piece and the first and second ends are shaped to form one of the plurality of openings.

17. The sliding assembly of claim 15, wherein the second sliding rod comprises a first piece and a second piece, each individually coupled with the support plate.

18. The sliding assembly of claim 15, wherein the first and second sliding rods are coupled with the support plate.

19. The sliding assembly of claim 15, further comprising:

a first spacer, configured to accommodate a first portion of the first set of fasteners and positioned over the first sliding tube; and a second spacer, configured to accommodate a second portion of the first set of fasteners and positioned over the second sliding tube.

20. The sliding assembly of claim 19, wherein the first and second spacers each includes a side opposite the first and second sliding tubes, respectively, shaped to complement a portion of the tour pack.

21. The sliding assembly of claim 15, wherein the direction of the major axes is substantially aligned with a longitudinal axis of the tour pack.

22. The sliding assembly of claim 15, wherein the plurality of selectable positions includes a forward-most position, a middle position, and a rearward-most position.

23. The sliding assembly of claim 22 wherein a distance between the rearward-most position and the middle position is approximately two inches.

24. The sliding assembly of claim 22, wherein a distance between the forward-most position and a rearward-most position is approximately four inches.

25. The sliding assembly of claim 15, wherein the first set of fasteners includes a plurality of bolts, each bolt attached to one of the first and second sliding tubes and configured to extend through original mounting holes of the tour pack.

26. The sliding assembly of claim 15, wherein the second set of fasteners includes a plurality of bolts, each bolt configured to extend through holes in the support plate into original mounting holes of a motorcycle frame tube.

* * * * *